[26.]
Calvin S. Young, Henry Wissinger and Thomas T. Williams' Improved Churn.
119,068.            Patented Sep. 19, 1871.
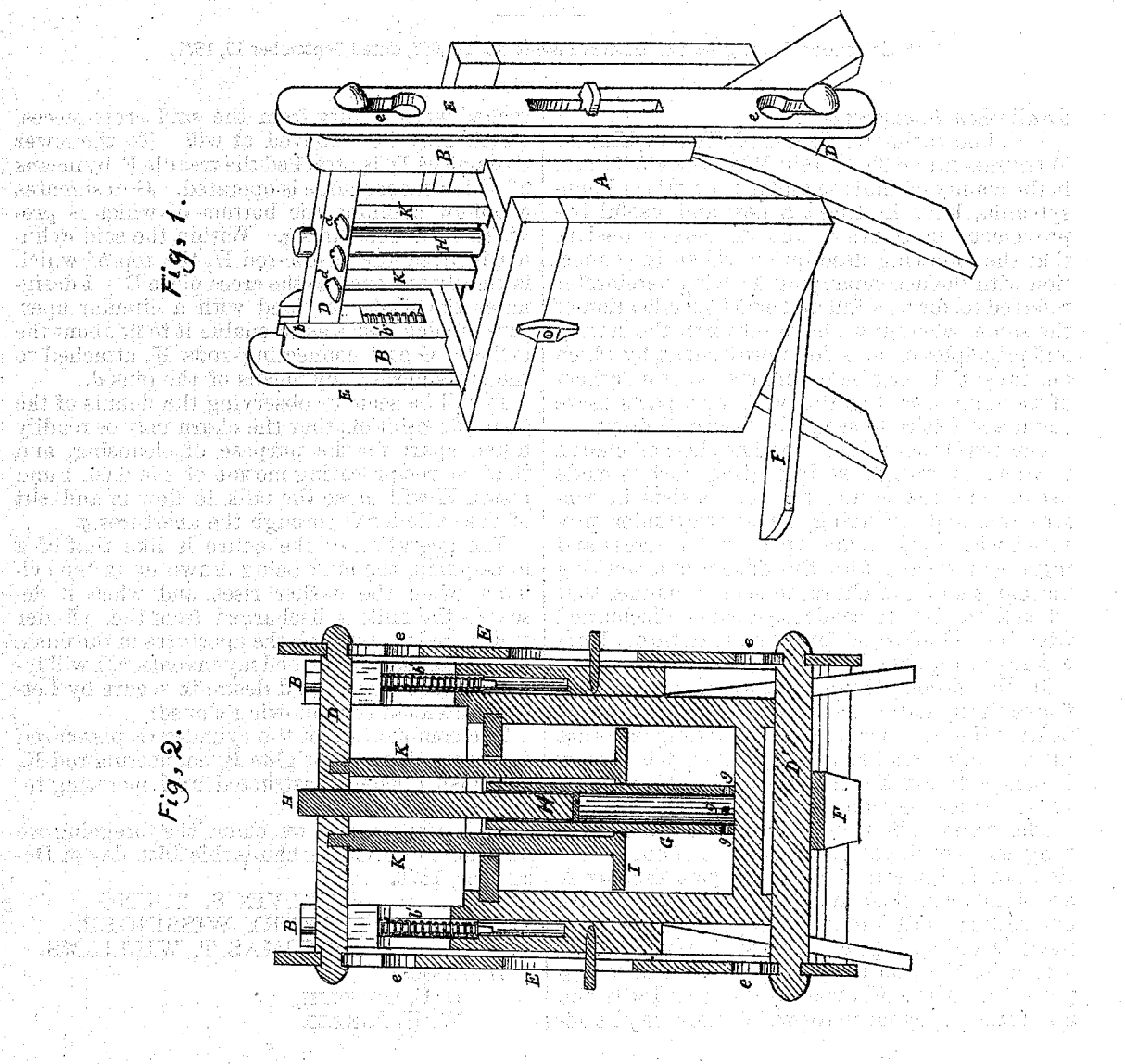
Witnesses,
H. A. Daniels
A. Warner
Calvin S. Young,
Henry Wissinger,  } Inventors,
Thomas T. Williams
by C. S. Whitman, Attorney,
529 Seventh St.,
Washington, D.C.
AM. PHOTO-LITHOGRAPHIC CO. N.Y. (OSBORNE'S PROCESS.)

UNITED STATES PATENT OFFICE.

CALVIN S. YOUNG, HENRY WISSINGER, AND THOMAS T. WILLIAMS, OF MINTA, PENNSYLVANIA.

IMPROVEMENT IN CHURNS.

Specification forming part of Letters Patent No. 119,068, dated September 19, 1871.

*To all whom it may concern:*

Be it known that we, CALVIN S. YOUNG, HENRY WISSINGER, and THOMAS T. WILLIAMS, of Minta, in the county of Indiana and in the State of Pennsylvania, have invented a new and useful Improvement in Churns; and do hereby declare that the following description, taken in connection with the accompanying drawing hereinafter referred to, forms a full and exact specification of the same, wherein we have set forth the nature and principles of our said improvement, by which our invention may be distinguished from others of a similar class, together with such parts as we claim and desire to secure by Letters Patent.

Our invention relates to that class of churns in which an upright reciprocating dash is made use of; and the nature thereof consists in constructing and arranging a hollow cylinder, provided with a piston and aperture for egress and ingress of cream, with the dasher and working mechanism of the churn, in such a manner that when the dasher descends the cream is discharged from the cylinder and forced upward through apertures in the said dasher.

In the accompanying drawing, which illustrates our invention and forms a part of the specification thereof, in which corresponding parts are illustrated by similar letters, Figure 1 is a view in perspective of the churn, and Fig. 2 is a transverse vertical section.

The construction, operation, and relative arrangement of the component parts of our invention are as follows: To the sides of the box A are rigidly attached the uprights B, in which are cut vertical slots $b$ for the reception of the cross-piece D and springs $b'$. The said cross-piece D is connected, by means of strips E, with the cross-piece D'. The said strips are provided with the apertures $e\ e$, by means of which they may be detached with facility from the said cross-pieces, which may be removed at will. To the lower cross-piece D' is attached the treadle F, by means of which the machine is operated. G designates a hollow cylinder, the bottom of which is provided with apertures $g$. Within the said cylinder is fitted the piston-rod H, the top of which is rigidly attached to the cross-piece D. I designates the dash, provided with a circular aperture of such a size as to enable it to fit about the cylinder G and connecting-rods K, attached to the cross-piece D by means of the pins $d$.

It will be seen, by observing the details of the above description, that the churn may be readily taken apart for the purpose of cleansing, and that the reciprocating motion of the dash I and piston H will cause the milk to flow in and out of the cylinder G through the apertures $g$.

The operation of the churn is like that of a force-pump, the milk being drawn up in the cylinder when the dasher rises, and when it descends the milk is discharged from the cylinder and forced up through the apertures in the dash.

Having thus described my invention, I will indicate what I claim and desire to secure by Letters Patent in the following clause:

The combination of the cylinder G, piston-rod H, cross-piece D, uprights B, connecting-rod K, and dash I, when constructed and operating together as described.

In testimony that we claim the foregoing we have hereunto set our hands this 16th day of December, 1870.

CALVIN S. YOUNG.
HENRY WISSINGER.
THOMAS T. WILLIAMS.

Witnesses:
E. B. GOODLIN,
W. H. KINTER.